May 13, 1958

J. I. SAVOCA 2,834,720

GRANULAR SOLIDS WITHDRAWAL METHOD AND APPARATUS

Filed Aug. 26, 1953

INVENTOR
JOSEPH I. SAVOCA,

BY Andrew L. Jabouriaut

AGENT

May 13, 1958  J. I. SAVOCA  2,834,720
GRANULAR SOLIDS WITHDRAWAL METHOD AND APPARATUS
Filed Aug. 26, 1953  5 Sheets-Sheet 3

INVENTOR
JOSEPH I. SAVOCA,
BY Andrew L. Gaboriault
AGENT

May 13, 1958 J. I. SAVOCA 2,834,720
GRANULAR SOLIDS WITHDRAWAL METHOD AND APPARATUS
Filed Aug. 26, 1953 5 Sheets-Sheet 4

INVENTOR
JOSEPH I. SAVOCA,
BY Andrew L. Gaboriault
AGENT

United States Patent Office 2,834,720
Patented May 13, 1958

---

2,834,720

GRANULAR SOLIDS WITHDRAWAL METHOD AND APPARATUS

Joseph I. Savoca, Woodstown, N. J., assignor to Socony Mobil Oil Company, Inc., a corporation of New York Application August 26, 1953, Serial No. 376,686

8 Claims. (Cl. 196—147)

This invention deals with a method and apparatus for contacting liquids with granular solids. It is particularly concerned with a method and apparatus for the controlled withdrawal of granular solids from the contacting zone of a liquid-granular solids contacting process.

Typical of the processes to which this invention applies is the process for the continuous countercurrent contacting of liquid hydrocarbon oils, such as mineral oil, with a granular adsorbent, such as fuller's earth, for the purpose of decolorizing the oil and removing small amounts of impurities therefrom. Other typical processes include continuous treatment of water with granular zeolites and liquid phase conversion of hydrocarbons in the presence of granular materials.

This invention will be best understood by referring to the attached drawings, of which.

All of these drawings are diagrammatic in form and like parts in all bear like numerals.

In processes of the aforementioned types, as well as many others wherein granular solids are passed as a columnar mass through the liquid-granular solids contacting zone, it is necessary to carefully control the rate of granular solids removal from the contacting zone, so that the ratio of liquid to granular solids therein can be maintained at some single desired value, optimum for efficient treating. The granular solids must usually be removed from the contacting zone as a slurry with some of the liquid charge. Such a slurry will frequently exhibit flow characteristics which make it impossible to effectively control the rate of granular solids removal by a variable area flow restriction, such as a valve. This is thought to be due to a change in composition of the slurry with changing flow restriction area.

Figure 1:
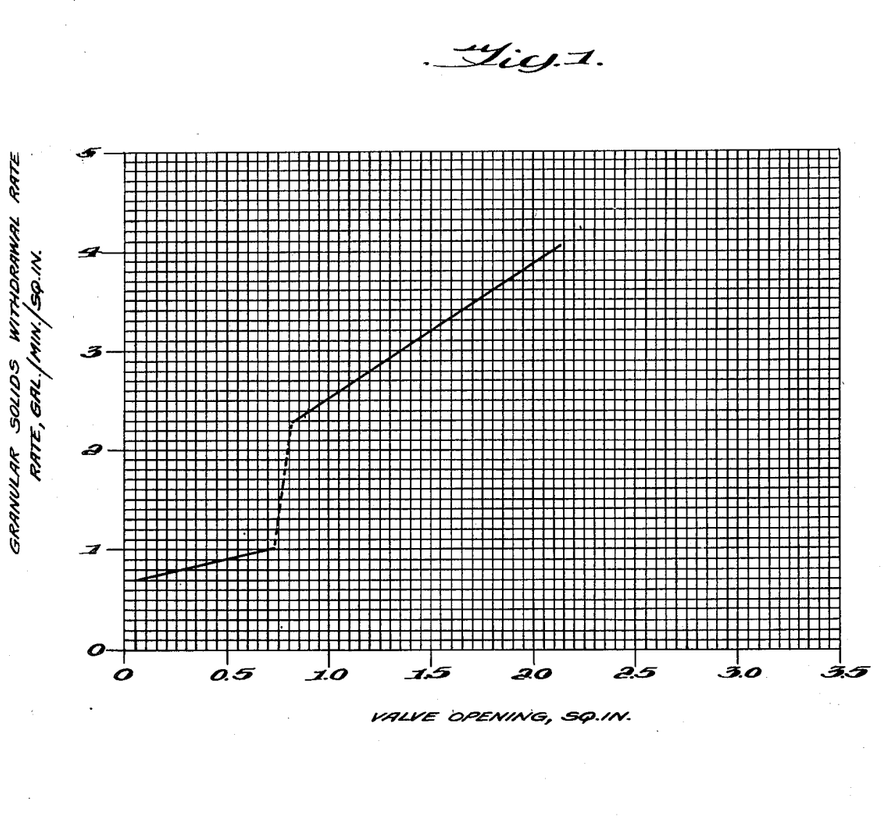
Figure 1 is a graph showing the variation of granular solids withdrawal rate with the area of a control valve opening in a mineral oil contacting system.

Figure 1 illustrates the flow control obtained by using a valve in the withdrawal line from the treater of a continuous mineral oil decolorization process which utilizes a granular adsorbent. The curve of Figure 1 illustrates the three different flow stages or types through which the slurry passes. These three stages are typical of materials which behave as non-Newtonian fluids, i. e., fluids whose viscosity varies with the rate of shear on the stream, rather than conventional Newtonian fluids, i. e., fluids whose viscosity remains constant regardless of the rate of shear. The first of these stages or types is shown by the lower solid line portion of the curve and may be termed the plastic or viscous stage. In this stage the granular solids flow rate increases progressively and regularly with increasing valve opening area. When the valve opening reaches a certain point, the flow characteristics of the stream are altered and the slurry stream passes through the transient condition represented by the dotted line in the graph. In this condition the flow rate of the solids is uncontrollable by the valve. The final stage is represented by the upper solid portion of the curve and may be termed the turbulent region. It is believed that when the slurry stream is in viscous or plastic type flow, the particles are substantially all touching or resting upon each other, while in the turbulent type of flow the particles are substantially all separated from each other. The transient stage represents a condition between these two. In many processes it will be desirable to control the flow of granular solids within the flow ranges wherein the slurry stream would fall into this transient type of flow. For example, in a process recently developed for the decolorization of mineral oils with a granular adsorbent, it is necessary to control the rate of adsorbent withdrawal from the treating zone carefully to accomplish efficient treating of the liquid. Very often the only practical adsorbent circulation rates for treating a particular oil will fall into this transient flow range.

A major object of this invention is to provide a method and apparatus for the removal of granular solids from liquid-granular solids contacting zones which overcomes the above-described difficulty.

Another object is to provide a method and apparatus for the controlled withdrawal of granular solids from liquid-granular solids contacting chambers.

Another object is to provide an efficient continuous process for the purification of liquid hydrocarbon oils by means of a granular adsorbent.

A further object of this invention is to provide a method and apparatus for the removal of granular solids from a contacting zone in which liquid hydrocarbons are being contacted with granular solids.

These and other objects will be apparent from the following discussion of the invention.

Before proceeding with this discussion, certain terms used in describing and claiming this invention will be defined. The terms "viscous condition" and "plastic condition," and other like terms are used herein to refer to a liquid-granular solids slurry stream having a liquid-granular solids composition such that the granular solids particles substantially all touch and rest upon each other. The term "turbulent condition" and similar terms are used herein to refer to a slurry stream having a liquid-granular solids composition such that substantially all of the granular solids particles are separated from each other. The term "transient condition" is used herein to refer to a stream having a composition intermediate between viscous condition and turbulent condition, as previously explained in connection with Figure 1. The term "liquid type flow" and similar terms are used herein to refer to a slurry stream having a liquid-solids composition such that the stream will flow in about the same manner as a liquid and, thus, will flow around corners and along a horizontal conduit under the influence of only a slight pressure head. A given slurry stream may be in liquid type flow and at the same time in any one of the viscous, turbulent or transient conditions. The liquid type flow condition is to be distinguished from a stream which exists as a "wet mass of granular solids,"

This term is used to refer to a stream having a liquid-granular solids composition such that the stream has the characteristics of granular solids flow, and thus will not flow downwardly through any passage which is not inclined with the horizontal by an amount at least equal to the angle of repose of the granular solids unless substantial pressure is exerted on the stream. The angle of repose of the granular solids is the angle which a conical pile of the dry solids, formed by issuance from a conduit, would make with the horizontal. It generally lies within the range 25–40 degrees and is usually about 30 degrees.

Streams existing as wet masses of granular solids will always be in the viscous flow condition. However, it should be emphasized that all streams in the viscous condition may not exist as wet masses of granular solids; some may be in liquid type flow, especially as the stream approaches the transient condition. However, with some slurries it may be that any composition which gives a stream in the viscous condition likewise gives a stream existing as a wet mass of granular solids.

This invention deals with a process in which liquid and granular solids are contacted in a zone from which granular solids, admixed with liquid, are withdrawn through an elongated passage to a flow obstruction. The liquid-granular solids slurry exists in the passage in a condition in which the granular solids flow rate cannot be dependably controlled by the flow obstruction. Broadly, this invention involves withdrawing sufficient liquid from said stream to change its condition to one in which the granular solids flow rate is capable of dependable flow control by the flow obstruction and then varying the degree of the flow obstruction to vary the flow of the granular solids and adjust it to a level suitable for the liquid-granular solids contacting in the zone.

In one of the broader forms of this invention, a stream of liquid-granular solids slurry is removed from a liquid-granular solids contacting zone and passed through a confined passage, the stream flowing in other than the viscous condition, that is, in the turbulent or transient condition. Sufficient liquid is removed from the stream to alter its condition to the viscous condition. After the stream has assumed the viscous condition, its flow is impeded or obstructed. The rate is then controlled by varying the degree of obstruction.

In another broad form, this invention involves removing a stream of liquid-granular solids slurry from a liquid-granular solids contacting zone and passing said stream flowing freely in liquid type flow downwardly through a confined passage. The stream here may be in any one of the viscous, turbulent or transient conditions. Adjacent the lower end of the passage sufficient liquid is removed from the stream, so that it ceases to flow in liquid type flow and assumes the state of a wet mass of granular solids. An obstruction is interposed to the downflow of the stream adjacent its lower end so as to substantially impede the downward flow of the stream, and then granular solids are removed from the obstructed area mechanically at controlled rates.

This invention should preferably be used with systems employing solids which are of palpable particulate form as distinguished from finely divided powders, and the term "granular" should be understood to refer to solids of this form. The solids may take the form of pellets, capsules, spheres, or the like, or solids of irregular shape such as are obtained from grinding and screening operations. Granular solids for treating liquid mineral oils generally should be within the size range 4 to 100 mesh, and preferably 10 to 60, and still more preferably 15 to 30 mesh by Tyler standard screen analysis.

Figure 2:
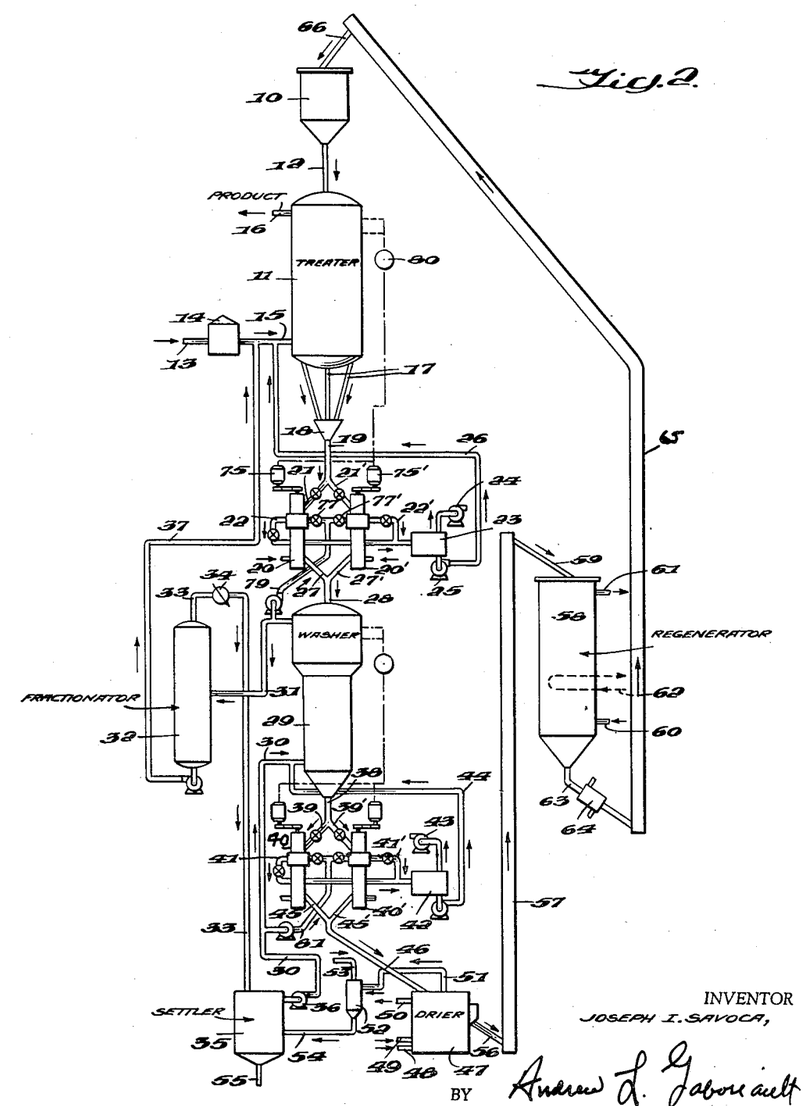
Figure 2 is a highly diagrammatic flow sheet illustrating a continuous mineral oil percolation process to which this invention applies.

Turning now to Figure 2, there is shown there the flow plan of a recently developed process for the treatment of liquid hydrocarbons with a granular adsorbent for the removal of small amounts of impurities from the liquid. This process is described and claimed in U. S. patent application Serial No. 177,408, filed August 3, 1950, now Patent No. 2,701,786. A suitable supply of granular adsorbent is maintained within a supply hopper 10. Typical adsorbents which may be employed are fuller's earth, bauxite, bentonite and bone char, charcoal, magnesium silicate, heat and acid-activated kaolin and activated carbon. Synthetic silica or alumina or silica-alumina gel adsorbents may also be employed. The liquid oil may be treated for a variety of purposes which include decolorization, removal of suspended, colloidal or dissolved impurities, such as carbon or coke or oxygen and nitrogen-containing impurities and other gum forming compounds and improvement of the properties of the oil which relate to de-emulsification.

The adsorbent gravitates from supply hopper 10 into the upper end of treater 11 through conduit 12. Adsorbent passes downwardly through the contacting zone within the treater as a columnar mass. A liquid hydrocarbon charge, such as a mineral oil or fuel oil of low asphalt content, enters the system through passage 13 and is heated in a heater 14 to the desired treating temperature. The treating temperature may be within the range 0–700° F. and should generally be below the flash point of the oil. In a typical mineral oil decolorization process, the treating temperature might be about 300° F. The heated charge passes into the lower section of the contacting zone within treater 11 through passage 15 and then passes upwardly through the columnar mass of adsorbent which effects the desired treatment. Treated product is removed through passage 16. The used adsorbent, bearing the adsorbed impurities, is removed from the lower section of the contacting zone together with some of the liquid charge as a liquid-granular solids slurry through passages 17. The separate slurry streams are combined in a funnel-shaped member 18 into a single stream which passes downwardly through passage 19. The slurry then passes to either one of two flow-regulating devices 20 and 20', which are described in more detail hereinbelow. Sufficient liquid oil is removed from the slurry stream through passages 22 or 22' to cause the stream to cease to flow in liquid type flow and to assume the characteristics of a wet mass of granular solids. This liquid oil passes to a tank 23, which is maintained under a reduced pressure by means of a blower 24. The oil which collects in the tank may be pumped back into the lower section of the treater by means of pump 25 through passages 26 and 15. Granular solids are mechanically forced from the lower section of flow-regulating devices 20 and 20' through passages 27 and 27' and then through passages 28 into the upper section of washer 29. The adsorbent passes downwardly through the washer as a columnar mass. A suitable wash solvent is supplied to the lower section of this mass through passage 30 and passes upwardly through the mass to remove adhering and occluded oil from the adsorbent. Typical solvents which may be used include carbon tetrachloride, normal heptane, normal octane, petroleum naphtha boiling within the range 100–400° F. and carbon disulfide. A preferred solvent is a paraffinic naphtha boiling within the range about 210–300° F. The washing step may be conducted at atmospheric pressure or at a pressure either above or below atmospheric, and at any temperature below that at which substantial vaporization of the solvent occurs, for example, 60–250° F.

Used solvent is removed from the upper section of the washer through passage 31 and passed to a fractionator 32. In the fractionator solvent is distilled from the liquid oil picked up in the washing zone. Solvent passes overhead through passage 33 and is condensed by condenser 34. The liquid solvent then passes to a combination settler and surge tank 35, from which it may be pumped by pump 36 back into washer 29 through passage 30. The liquid oil, freed of solvent, is taken as bottoms from the fractionator 32 and recycled through passages 37 and 15 back to the contacting zone within treater 11. The washed adsorbent is removed through passage 38 and then passed through either of passages 39 or 39' into one of two flow-regulating devices 40 and 40', similar to the flow-regulating devices between the treater and the washer described hereinbelow. Solvent and washed granular solids flow from the washer to the flow-regulating devices as a liquid-granular solids slurry flowing in liquid type flow. Sufficient liquid solvent is removed from the slurry stream within the flow-regulating devices to reduce the stream to a wet mass of granular solids. This liquid solvent is passed through either of passages 41 or 41', depending on which device is being used, into tank 42 maintained under reduced pressure by blower 43. Solvent from tank 42 may then be returned to washer 29 through passage 44. Solids are mechanically forced from the lower section of the flow control device in use through either passage 45 or 45' into passage 46 and then into drier 47.

One suitable type of drier is described and claimed in U. S. Patent No. 2,813,352. In this type of drier, the adsorbent is maintained within the drier as a boiling bed by means of a condensible stripping gas which enters the drier through passage 48 and passes upwardly through the drier. Heating tubes are maintained within the drier and supplied with a suitable heating fluid through passage 49. Used heating fluid is removed through passage 50. The stripping gas, which, for example, may be steam, and the solvent vapor pass from the upper section of the drier through passage 51 into a quencher 52. The flow of stripping gas through the drier may be controlled to remove any adsorbent fines therein in the manner described and claimed in U. S. patent application Serial No. 277,982, filed March 22, 1952, now Patent No. 2,766,191. Suitable condensing fluid, such as water, is admitted to quencher 52 through passage 53 to condense the solvent and stripping gas. The liquid materials are then passed from the quencher into settler 35 through passage 54. In settler 35 the water and adsorbent fines collect in the bottom of the settler and are removed through passage 55.

The dried adsorbent passes from drier 47 through passage 56 into the lower section of a conveyor 57. This conveyor may be, for example, a bucket elevator or gas lift. Dried adsorbent is elevated by conveyor 57 and discharged from the upper end thereof into regenerator 58 through passage 59. The adsorbent passes through the regenerator as a downwardly gravitating, substantially compact column. A suitable oxygen-containing gas, such as air, is admitted to this column through passage 60. This gas passes through the column to burn from the adsorbent the impurities deposited thereon in the contacting zone. These impurities may consist of carbonaceous materials, color bodies and the like. Flue gas is removed from the regenerator through passage 61. Cooling coils 62 are provided within the regenerator to control the temperature therein below the temperature at which the adsorbent would be permanently damaged by heat. The regenerated adsorbent is removed from the lower section of the regenerator through passage 63 and passes through a cooler 64, wherein the temperature of the adsorbent is reduced to the contacting temperature desired to be maintained within treater 11. The adsorbent is then conveyed by means of conveyor 65 and passage 66 to supply hopper 10.

Figures 3, 4:
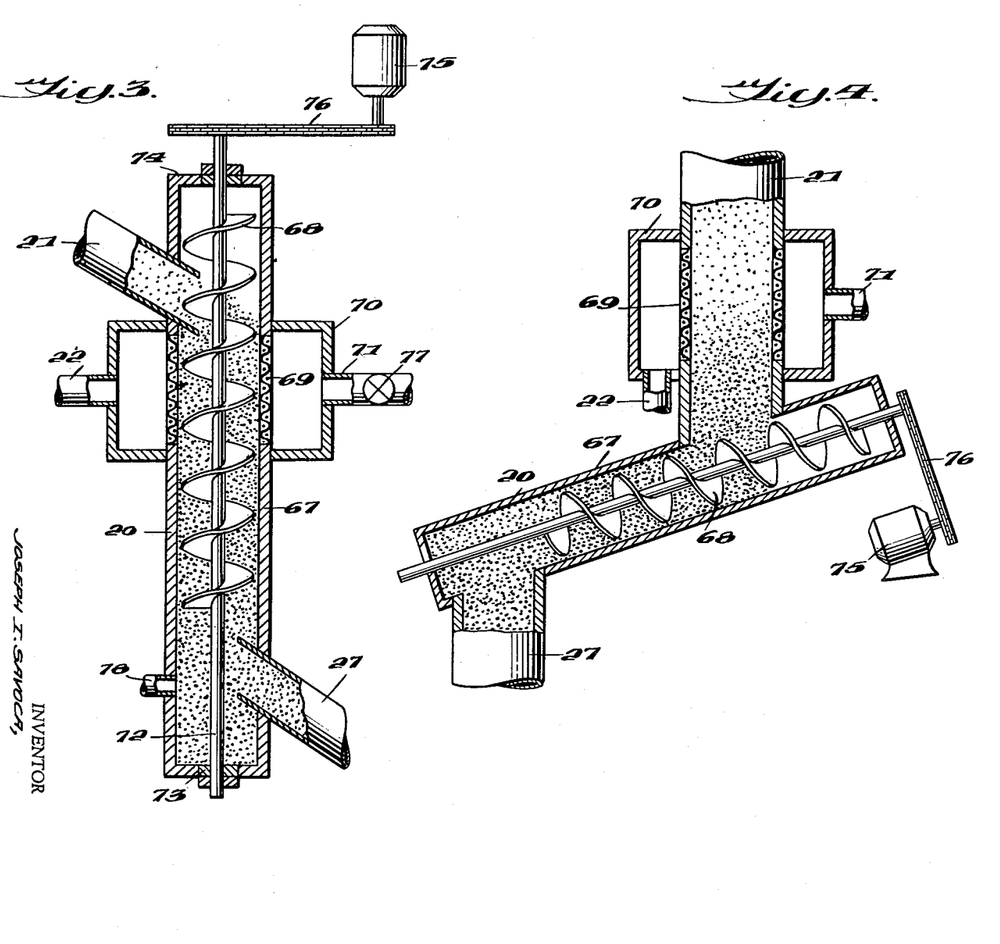
Figure 3 is an elevational view, partially in section, of one form of the apparatus of this invention.
Figure 4 is an elevational view, partially in section, of a second form of apparatus of this invention.

Details of one form of flow control device of this invention are shown in Figure 3. The control device here consists of a screw conveyor 20 having a casing 67 with a screw 68 therein. Inlet conduit 21 extends into the upper section of the conveyor, while outlet conduit 27 extends from its lower section. A portion of the length of casing 67, immediately below inlet conduit 21, is made up of a screen 69. This screen may be welded or bolted to the remainder of the casing. Around the outside of this screen is maintained a closed chamber 70. From chamber 70 extends liquid removal conduit 22, while into chamber 70 extends conduit 71 for the supply of a fluid to the chamber for flushing or back-washing screen 69. The shaft 72 of screw 68 extends through both ends of casing 67 by means of bearings 73 and 74. A suitable variable drive motor 75 engages the upper end of shaft 72, either by belt or gear drive 76, so that screw 68 may be rotated at any desired rate.

In operation, a stream of liquid-granular solids slurry in liquid type flow passes into screw conveyor 20 through passage 21. Since this stream is of a composition in the liquid flow type range, screw 68 furnishes no obstruction to flow and therefore does not control the rate of granular solids or liquid-granular solids removal from the contacting zone from which conduit 21 extends. However, as the slurry passes through the screen section 69, sufficient liquid is removed from the stream to alter its characteristics from liquid type flow to the characteristics of a wet mass of granular solids. This liquid removal is effected by maintaining a reduced pressure through conduit 22, which acts to suck the liquid through screen 69 into chamber 70 and then out through conduit 22. In normal operation, conduit 71 is closed off by means of valve 77. As soon as the stream assumes the character of a wet mass of granular solids, screw 68 immediately acts as an obstruction or impediment to further downflow of the stream. The stream, which is now mainly granular solids, can therefore only flow further through screw conveyor 20 according to the rate of rotation of the screw 68. This rate of rotation is then controlled so that granular solids will be moved by the screw at the rate at which it is desired that they be removed from the contacting zone through conduit 21. The rate of movement of granular solids by the screw is reflected back up the passage to the contacting zone to control the rate at which granular solids are removed therefrom. Granular solids are then forced out of the conveyor through passage 27 into the next step of the treating process. In order that the pressure in the vessel from which the control device is drawing granular solids and the pressure in the vessel to which the device is feeding granular solids may be maintained, a suitable inert gas may be admitted through passage 78 as a sealing medium. Should screen 69 become plugged with adsorbent, flow through passage 21 is cut off. A suitable fluid for flushing or back-washing the screen may then be admitted through chamber 70 through passage 71. This fluid flows from the chamber through the screen 69 into the screw conveyor 20 and thereby frees screen 69 of adsorbent particles which may be plugging up the holes of the screen.

Returning to Figure 2, the manner in which the flow device is utilized in this system is illustrated. Two of the flow devices 20 and 20' are utilized below the treater so that when one becomes plugged, flow may be shifted to the other one immediately and the process need not be interrupted. Liquid oil removed through passages 22 and 22' is returned to the treater as previously described. When a back-washing fluid is required, a portion of the wash tower effluent may be pumped from passage 31 through passage 79 into either 20 or 20', as required by operation of valves 77 and 77'. This back-washing liquid will then immediately pass down into washer 29. The rate of rotation of screw 68 may be controlled automatically in the following manner. It is normally desired to control the rate of adsorbent withdrawal from the contacting zone within the treater 11 so as to maintain a constant adsorbent bed height within the treater. Therefore, a suitable device for indicating the height of the adsorbent bed, such as that described and claimed in U. S. patent application Serial No. 387,744, filed October 22, 1953, is used to determine the bed height. This level measuring device actuates a controller 80, which in turns controls the operation of motors 75 and 75' to cause screw 68 to rotate at the rate suitable for maintaining the bed height within the treater constant. The operation of the flow control devices 40 and 40', which are used between the washer and the drier, is similar to that described for devices 20 and 20'. In this case, the back-washing fluid might be fresh wash naphtha admitted through passage 81.

Turning now to Figure 4, there is illustrated there a less preferred form of this invention. In the device of Figure 4, a portion of the lower section of passage 21, which extends from the liquid-granular solids contacting zone, is made up of a screen 69. Around the screen is chamber 70 with liquid withdrawal passage 22 extending therefrom and back-washing fluid inlet passage 71 extending therein. Beneath the lower end of passage 21 and below screen 69 is screw conveyor 20 in an inclined position, with inlet end above outlet end. A stream of liquid-granular solids slurry in liquid type flow passes from the contacting zone downwardly through passage 21. As the stream passes through the portion of passage 21, enclosed by screen 69, liquid is removed from the stream through screen 69 into chamber 70, either by natural drainage or by a suction maintained on passage 22. Liquid is continuously removed from chamber 70 through passage 22. Sufficient liquid is removed from the slurry stream screen 69 to cause the stream to assume the characteristics of a wet mass of granular solids. This wet mass then passes down into the screw conveyor 20, wherein screw 68 furnishes an obstruction to further flow of the stream. Screw 68 is then rotated at a rate suitable to maintain the desired rate of granular solids withdrawal through passage 21. Granular solids pass from the conveyor through passage 27. In this form of the invention, the liquid drain section must be close enough to the lower end of the passage that after liquid removal the granular solids will drop easily from the passage and not plug up therein.

Figure 5:
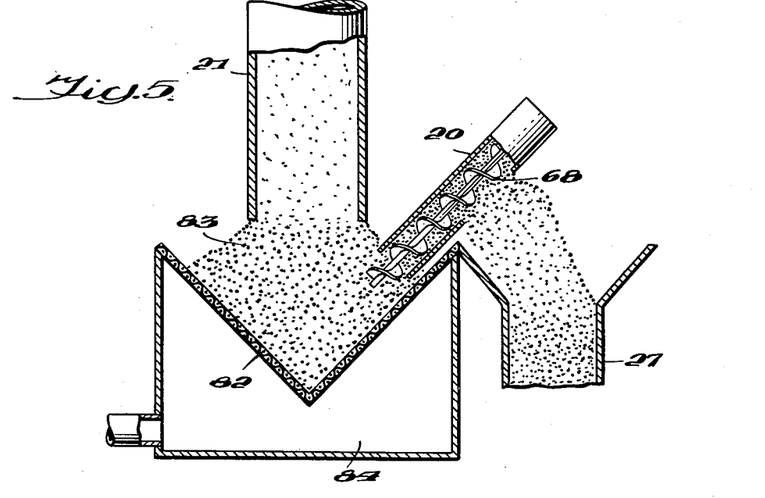
Figure 5 is an elevational view, partially in section, of a third form of apparatus of this invention.

Figure 5 illustrates another device which is within the broader scope of this invention. Beneath passage 21, which extends from the liquid-granular solids contacting zone, is a screen 82 in the shape of an inverted cone. On this screen, between the lower end of passage 21 and the screen, is maintained an accumulation of the granular solids 83. A stream of liquid-granular solids slurry in liquid type flow passes from the contacting zone downwardly through passage 21. This stream, while in liquid flow, issues from passage 21 and strikes accumulation 83. At this point the liquid filters down through accumulation 83 and then through screen 82 into a chamber 84 maintained below the screen, so that the stream ceases to flow in liquid flow and assumes the character of a wet mass of granular solids. As the stream assumes this character, it is obstructed by accumulation 83, since the outward expansion of wet masses of granular solids is limited by the angle of repose of the solids. Thus, if no system for removal of granular solids from accumulation 83 were provided, flow of granular solids from passage 21 would be stopped as soon as the accumulation built to the level of the lower end of the passage. Therefore, granular solids are removed from accumulation 83 at the rate at which it is desired that they be removed from the contacting zone by screw conveyor 20 or some other mechanical device. Granular solids are discharged from the screw conveyor into passage 27 to be carried to the next step in the treating processs. It will be noted that in this form of the invention, liquid is drained from the slurry stream by gravity rather than by suction, and that the liquid removal from the stream occurs after the stream is no longer within a confining passage.

Figure 6:
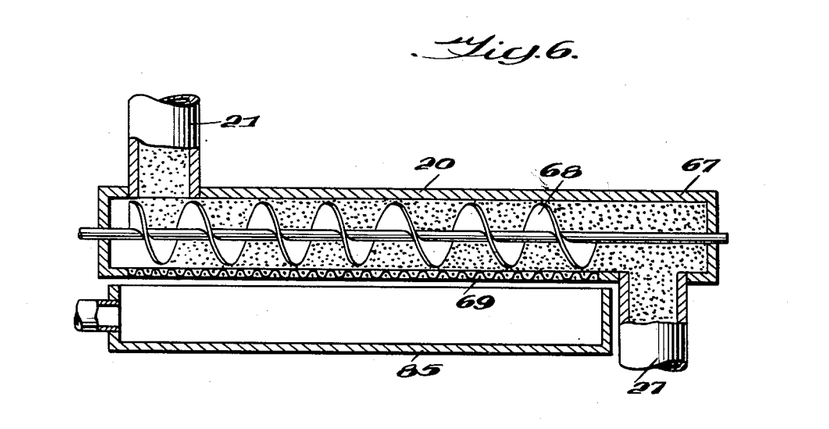
Figure 6 is an elevational view, partially in section, of a fourth form of the apparatus of this invention.

Still another form which this invenetion may take is illustrated in Figure 6. There, screw conveyor 20 is situated with its axis in a horizontal plane. The underside of casing 67, along the entire length of screw 68, is made up of a screen 69 of size suitable to retain the granular solids on its upper surface. The stream of liquid-granular solids slurry from the contacting zone in liquid type flow enters the inlet end of screw conveyor 20 through passage 21. This stream will flow along the screw conveyor unobstructed by screw 68. As it flows, liquid drains through screen 69 into receptacle 85. At some point along the length of the conveyor, the stream will cease to flow in liquid type flow and assume the properties of a wet mass of granular solids. At this point screw 68 immediately obstructs further flow of the stream. Screw 68 is then rotated so that further flow of the stream is at the rate at which it is desired that granular solids be removed from the contacting zone.

Figures 7, 8:
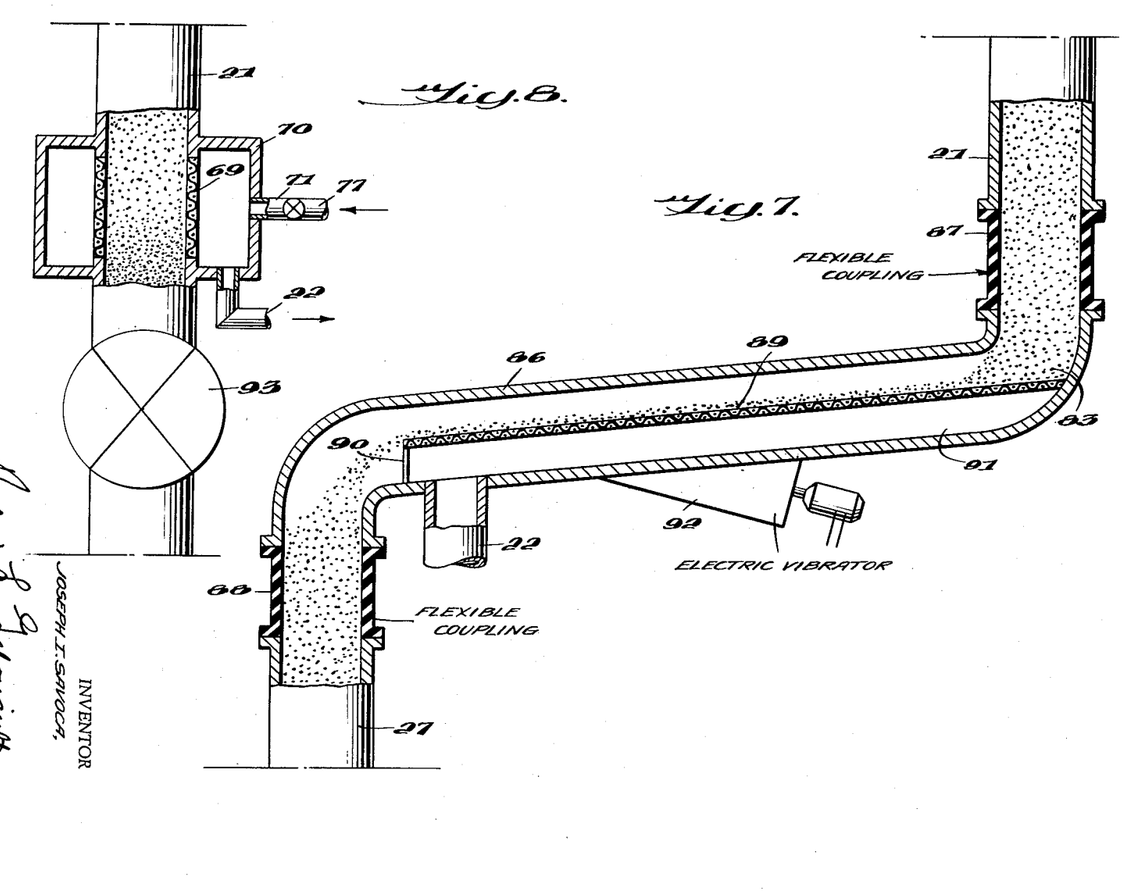
Figure 7 is an elevational view, partially in section, of another form of this invention.
Figure 8 is an elevational view, partially in section, of a further form of this invention.

Figure 7 illustrates another device within the broader scope of this invention. Shown there is an inclined conduit 86 at an angle with the horizontal greater than zero but less than the angle of repose of the granular solids. Passage 21 from the contacting chamber connects to the upper end of conduit 86 by means of a flexible coupling 87, while discharge conduit 27 connects to the lower end of 86 by means of flexible coupling 88. Couplings 87 and 88 should be made of material which will expand and contract as conduit 86 is moved up and down. A screen 89 of less mesh size than the granular solids extends down conduit 86 parallel to its longitudinal axis of symmetry. Screen 89 extends from the wall of 86 beneath conduit 21 to a point short of the wall of 86 above conduit 27. The screen also extends laterally across conduit 86 and its lower edge is supported on a solid support member 90, so that a liquid receiving chamber 91 is formed in the lower portion of conduit 86, beneath screen 89 and above member 90.

In operation, the liquid-granular solids slurry from the contacting zone passes downwardly in liquid type flow through vertical passage 21. This stream impinges on screen 89. Liquid is removed from the stream through the screen so that the stream assumes the character of a wet mass of granular solids and an accumulation of granular solids 83 is formed which acts to obstruct the granular solids flow from passage 21. Conduit 86 is then vibrated by means of an electric or mechanical vibrator 92 of conventional design. This causes the solids to move away from accumulation 83 down screen 89. Solids are discharged from the lower end of the screen into conduit 27, from which they may pass to the next step of the process. The degree of obstruction of flow from passage 21 and, therefore, the flow rate of the granular solids from the passage and the contacting zone thereabove, may be varied by varying the rate of vibration of conduit 86 under the influence of vibrator 92.

The vibrator may consist of a high-speed unbalanced flywheel, electromagnetic vibrations from one or more solenoids, or a rotating crank or cam shaft. The use of a solenoid is preferable, however, because of the ease of adjusting the rate of vibration by a change in current density to adjust the granular solids flow rate. Also, the solenoid does not require lubrication and has a low power requirement.

Another somewhat different form of this invention is illustrated in Figure 8. This form finds particular application where the slurry stream is not only in liquid type flow but also is in the turbulent or transient flow condition previously described. Referring to Figure 1, momentarily, it will be noted that when the slurry stream is in the viscous condition, its rate of flow is controllable by a variable area mechanism such as a valve. In the device of Figure 8, the slurry stream in the turbulant or transient condition, i. e., substantially all of the particles in the stream are not resting on or touching each other, descends from the contacting zone through conduit 21. The conduit is equipped with a screened section 69. As the stream passes this section, sufficient liquid is removed therefrom to cause the stream to assume the viscous condition of flow. In this condition, the flow rate is controllable by a variable area flow throttle or restriction, so that valve 93 is provided below screened section 69, by means of which the flow rate from the contacting zone is adjusted. Valve 93 may be any variable area mechanism suitable for use with flowing granular solids. Thus, a plug valve or slide valve may be used. Likewise, a plate with a variety of different sized orifices capable of being positioned within the passage may be used. The symbolic valve shown on the drawing is intended to indicate generically any of these devices as well as any other similar devices.

It should be noted that in all the various forms of this invention the slurry stream is removed from the contacting zone in a condition such that the rate of granular solids flow in the stream cannot be controlled by impeding or obstructing the stream and varying the degree of impedimentation or obstruction. In this condition the flow rate does not increase progressively as the degree of obstruction is reduced. In this invention sufficient liquid is then removed from the stream to place it in a condition where it may be controlled successfully and dependably by controlling the degree of obstruction.

When a variable area device is used to control the flow, such as is shown in Figure 8, the liquid removal must precede the device. Sufficient liquid should be removed to get the stream into the viscous flow condition. However, liquid should not be removed to a point where the stream will not flow easily through the variable area device. The stream should not be made too dry, in other words. Liquid removal, in this species, may be effected by either the use of suction or by using natural drainage only.

With the various forms of mechanical devices for controlling the flow for which the slurry stream must be reduced to a wet mass of granular solids, such as those shown in Figures 1–7, there is generally no limit on the amount of liquid that may be removed from the stream. However, if the obstruction and drain sections do not coincide, as in Figure 4, the stream should not be made so dry that it will plug up in the passage before reaching the obstruction. When the two do coincide, the stream may be made as dry as desired. The mechanical means for moving the solids from the obstructed area may be any suitable device and need not necessarily be a screw conveyor. Thus, a bucket wheel, a scoop, a moving compartmented belt and similar devices could be used in some of the species of this invention, for example, those shown in Figures 4 and 5. In this form of the invention, the liquid may be removed while the slurry stream is still within a confined passage, as in Figures 3, 4 and 6, or it may be removed after the stream leaves the passage, as in Figure 5. Liquid removal can be effected by suction or merely by gravity drainage. When a screw conveyor is used, the liquid removal may occur at some point along the length of the conveyor (Figure 3) or along the entire length of the conveyor (Figure 6) or at a point shortly above the conveyor (Figure 4).

The broader claims of this invention are intended to cover the method and apparatus of U. S. patent application Serial No. 376,687, filed August 26, 1953, and the method and apparatus of U. S. patent application Serial No. 637,730, filed February 1, 1957.

When a screw conveyor is used, it is preferable that the drain or suction section begin about one turn of the screw downstream of the slurry inlet. This will insure that each spiral turn will be full of adsorbent after the liquid is removed. The screw flights should clear the screw casing by one and preferably five average particle diameters of the adsorbent. The average size of various mesh granular solids are shown in Table I. The large screw clearance results in reducing the granular solids grinding action between screw and casing by permitting a filter cake to build up between screw and casing. This filter cake will also build up in front of the filter medium, through which liquid is being removed, and help to prevent plugging of the medium by granular solids fines. The screw conveyor is preferably operated with the screw in the vertical position with inlet above the outlet. However, the screw may be horizontal or inclined with inlet point either above or below the outlet within the scope of this invention.

The draining or filter medium through which the liquid is removed may consist of any screen or porous material through which separation of liquids from solids can be effected. A preferred material is stainless steel woven wire screening having square or rectangular openings. The screen mesh size to be used depends upon the size of the granular solids particles. Table I gives the preferred screen size for granular solids of varying sizes.

*Table 1*

| Granular Solids Size | | Screen Opening | |
|---|---|---|---|
| Mesh | Average Particle Diameter, Inches | Mesh | Inches |
| 4–8 | 0.139 | 12 | 0.055 |
| 8–15 | 0.063 | 30 | 0.0214 |
| 15–30 | 0.032 | 60 | 0.0097 |
| 30–60 | 0.0155 | 100 | 0.0049 |
| 60–80 | 0.0079 | 150 | 0.0041 |
| 80–100 | 0.0054 | 200 | 0.0029 |
| >100 | | Porous Media | |

When a form of this invention is used that requires liquid to be removed from the slurry stream sufficient to reduce the stream to a wet mass of granular solids, generally, for hydrocarbon material, the liquid content of the stream should be reduced below that determined from the following equation to transform the stream from a liquid type to a granular solids type:

$$L = 100 V^{0.0217} - 54$$

where $L$ = percent volume liquid in the stream and $V$ = viscosity of the liquid in centipoises. The maximum allowable liquid content as determined by this equation applies particularly when the adsorbent is of a size about 30 to 60 mesh Tyler. With larger size particles, the maximum will be somewhat higher than determined by the equation, while with smaller particles it may be somewhat lower. With the liquid content below this value, the stream will behave as a wet mass of granular solids.

As an example of a suitable design according to this invention, an apparatus similar to that of Figure 3 will be discussed. This apparatus was designed to remove a 15–30 mesh granular adsorbent at the rate of 15 gallons per minute from a treating vessel. The slurry stream that was removed from the treater was composed of adsorbent and liquid oil amounting to about fifty-five percent by volume of the slurry stream. The screw conveyor casing had a 6-inch diameter and the screw cleared the casing by about 5 particle diameters. The conveyor was 6 feet long and the casing for 2 of these feet was made up of a 60 mesh wire screen. A variable drive motor capable of operation between 0–100 revolutions per minute was connected to the screw. The rated capacity of the apparatus at 100 revolutions per minute was 20 gallons per minute of adsorbent. A suction of about 10 inches of water was maintained on the outside of the screen to effect the required alteration in composition.

This invention should be understood to include all changes and modifications of the examples of the invention herein chosen for purposes of disclosure which do not constitute departures from the spirit and scope of the invention.

I claim:
1. A method for the controlled withdrawal of granular solids from a liquid hydrocarbon-granular solids contacting zone, which comprises: passing a liquid hydrocarbon-granular solids stream downwardly from the contacting zone as a slurry stream flowing in other than viscous flow through a confined passage, removing sufficient liquid hydrocarbon from said stream while in said passage to convert the stream into viscous flow, interposing an obstruction to flow in said passage after said stream is in viscous flow and varying the degree of obstruction to vary the rate of flow of the granular solids through said passage.

2. A method for the controlled withdrawal of granular solids from the contacting zone of a process for contacting liquid hydrocarbon with granular solids, which comprises: removing a stream of liquid hydrocarbon and granular solids slurry from the contacting zone and passing said stream flowing freely in turbulent type flow downwardly through a confined passage, removing sufficient liquid hydrocarbon from the stream adjacent the lower end of the passage so that the stream ceases to flow in turbulent type flow and assumes the state of a wet mass of granular solids, interposing an obstruction to the downflow of the stream adjacent the lower end of the passage so as to substantially impede downward gravity flow of the stream and mechanically effecting removal of the stream from the obstructed area at controlled rates.

3. A method for the withdrawal of granular solids at controlled rates from the contacting zone of a process for the contacting of liquid hydrocarbons and granular solids, which comprises: passing a stream of liquid hydrocarbon-granular solids slurry downwardly in turbulent type flow from the contacting zone, removing sufficient liquid hydrocarbon from said stream to cause it to be altered in character to a viscous flow type stream, obstructing the flow of said stream as it assumes viscous type flow and mechanically removing granular solids from the obstructed area at a rate controlled at the desired level whereby the rate of granular solids removal from the contacting zone is controlled.

4. A method for the controlled withdrawal of granular solids from the lower section of the contacting zone of a liquid hydrocarbon-granular solids contacting process, which comprises: passing a stream of granular solids-liquid hydrocarbon slurry in turbulent type flow downwardly from the lower section of the contacting zone through a confined passage, removing sufficient liquid hydrocarbon from the stream at a level above the lower end of the passage so that the stream ceases to flow in turbulent type flow and assumes the character of a wet mass of granular solids, obstructing the flow of said stream after it has assumed the character of a wet mass of granular solids so as to substantially impede the downward flow of said stream and mechanically removing the granular solids from the obstructed area at controlled rates.

5. A method for the controlled withdrawal of granular solids from the contacting zone of a liquid oil-granular solids contacting process, which comprises: passing a stream of liquid oil-granular solids slurry downwardly from the contacting zone in turbulent type flow through a confined passage, providing within said passage a screw conveyor, removing liquid from said stream around at least the upper section of said screw conveyor so that said stream ceases to flow in turbulent type flow and assumes the characteristics of a wet mass of granular solids, the flow of which is immediately obstructed by the screw conveyor, operating the screw conveyor so as to force granular solids from the lower end of the passage and controlling the rate of rotation of the screw to control the rate of withdrawal of granular solids from the contacting zone.

6. A method for the controlled withdrawal of granular solids from the contacting zone of a liquid hydrocarbon-granular solids contacting process, which comprises: passing a stream of liquid hydrocarbon-granular solids slurry downwardly from the lower section of the contacting zone in turbulent type flow through a confined passage, discharging said stream into the upper section of a vertically-situated screw conveyor, removing sufficient liquid hydrocarbon from said stream as it flows downwardly through the screw conveyor by means of suction applied through the perforated walls of the conveyor to change the character of the flow of said stream from turbulent type to viscous type, whereby the flow of said stream will be immediately obstructed by the screw conveyor when it assumes viscous type flow, and rotating the screw conveyor at a rate suitable to cause granular solids to discharge from the lower end thereof at the rate at which it is desired that granular solids be removed from the contacting zone.

7. A method for removing granular solids from the contacting zone of a liquid hydrocarbon-granular solids contacting process, which comprises: passing a slurry stream of liquid hydrocarbon and granular solids flowing in other than viscous type flow downwardly through a substantially vertical confined passage, removing sufficient liquid hydrocarbon from said stream while in said passage to alter its character of flow to viscous type flow, throttling said stream after it assumes viscous type flow and adjusting said throttling to adjust the rate of granular solids removal from said contacting zone.

8. A continuous process for the treatment of liquid mineral oils with adsorbents of palpable particulate form to remove small amounts of impurities, which comprises: passing the adsorbent downwardly through a confined contacting zone as a columnar mass, introducing liquid oil into the lower section of said columnar mass and passing the liquid oil upwardly through the columnar mass at a velocity below the column disrupting velocity, supplying adsorbent to the upper section of said columnar mass, removing treated liquid from the upper section of the contacting zone, removing adsorbent admixed with some liquid oil from the lower section of the contacting zone at a plurality of points across the column cross-section, passing a stream of liquid oil-adsorbent mixture in other than viscous flow from each of said points downwardly, combining said streams into a single stream flowing in other than viscous flow through a substantially vertical confined passage, removing liquid oil from said stream in said passage to alter the character of flow to viscous type flow, obstructing the flow of said stream after it assumes viscous flow and varying the degree of said obstruction to vary the rate of flow of adsorbent from said contacting zone.

References Cited in the file of this patent

UNITED STATES PATENTS

| | | |
|---|---|---|
| 960,546 | Hendryx | June 7, 1910 |
| 1,604,649 | Manning | Oct. 26, 1926 |
| 2,073,388 | Elliott et al. | Mar. 9, 1937 |
| 2,226,242 | Harrington | Dec. 24, 1940 |
| 2,342,862 | Hemminger | Feb. 29, 1944 |
| 2,560,147 | Anderson | July 10, 1951 |
| 2,592,983 | Hildebrandt | Apr. 15, 1952 |
| 2,631,727 | Cichelli | Mar. 17, 1953 |
| 2,676,469 | Wenzelberger | Apr. 27, 1954 |
| 2,701,518 | McDonald | Feb. 8, 1955 |
| 2,701,786 | Evans et al. | Feb. 8, 1955 |
| 2,709,674 | Bergstrom | May 31, 1955 |

FOREIGN PATENTS

| | | |
|---|---|---|
| 188,362 | Great Britain | Nov. 7, 1922 |